United States Patent
Hansen et al.

(10) Patent No.: US 9,575,629 B1
(45) Date of Patent: Feb. 21, 2017

(54) SWITCHING BETWEEN ELECTRONIC DESKTOPS ON MULTIPLE DISPLAYS

(71) Applicant: Pear Software, Bountiful, UT (US)

(72) Inventors: Andrew S. Hansen, Bountiful, UT (US); Scott B. Hansen, Jupiter, FL (US)

( * ) Notice: Subject to any disclaimer, the term of this patent is extended or adjusted under 35 U.S.C. 154(b) by 511 days.

(21) Appl. No.: 14/072,066

(22) Filed: Nov. 5, 2013

Related U.S. Application Data

(63) Continuation of application No. 13/625,843, filed on Sep. 24, 2012, now Pat. No. 9,069,444.

(60) Provisional application No. 61/538,758, filed on Sep. 23, 2011.

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
CPC .... G06F 3/1431; G06F 3/0484; G06F 3/1438; G06F 3/1423; G06F 3/023; G06F 3/0227; G06F 9/542
USPC ........................................................ 709/203
See application file for complete search history.

(56) References Cited

U.S. PATENT DOCUMENTS

| | | | |
|---|---|---|---|
| 2011/0225537 A1* | 9/2011 | Wang | G06F 1/181 715/778 |
| 2012/0151403 A1* | 6/2012 | Bhogal | G06F 3/1431 715/778 |

* cited by examiner

*Primary Examiner* — Tu Nguyen
(74) *Attorney, Agent, or Firm* — Workman Nydegger

(57) ABSTRACT

A computer implemented method includes providing an operating system for controlling electronic desktops displayed on multiple monitors. The methods include providing a plurality of electronic desktops for a first monitor and a different plurality of electronic desktops for a second monitor and allowing independent switching of desktops on the first and second monitors. The methods also include moving electronic desktops between monitors.

19 Claims, 4 Drawing Sheets

SWITCHING BETWEEN ELECTRONIC DESKTOPS ON MULTIPLE DISPLAYS

CROSS-REFERENCE TO RELATED APPLICATIONS

This Application is a continuation-in-part of U.S. patent application Ser. No. 13/625,843, titled Methods For Synchronizing Large Files With A Cloud Network, filed Sep. 24, 2012, which claims the benefit of U.S. Provisional Patent Application No. 61/538,758, titled Methods For Synchronizing Large Files With A Cloud Network, filed Sep. 23, 2011, both of which are hereby incorporated by reference in their entirety.

BACKGROUND

Field of the Invention present invention relates to methods for displaying electronic desktops on a computer monitor. In particular, the present invention relates to switching between electronic desktops on computers with multiple monitors and switching electronic desktops between monitors.

Related Technology

Modern computer hardware and the operating systems that control the hardware typically support multiple displays. The use of multiple monitors with a single operating system is typically done to facilitate display of content.

The operating system typically allows one of two different configurations for the second monitor. In the first scenario, the second monitor becomes an extension of the screen. The user indicates the side on which the second monitor is relative to the first monitor and the user can move objects from one screen to the next. This is the typical setup for a traditional desktop computer with two monitors. In a second scenario, the second monitor will be a mirror image of the first screen. The operating system simply outputs the content of the first screen to the second screen. This scenario is frequently used for group presentations where the user wants to display content from a relatively small personal computer screen (e.g., a laptop) to a conference room projector or large monitor.

Another reason for using two monitors is when running multiple operating systems on the same computer. In this scenario, the resources of the computer hardware are divided up between the two or more operating systems. Often the two different operating systems cannot share a monitor at the same time and thus need a dedicated monitor. The purpose and configuration of multiple monitors in a dual operating system configuration is vastly different than a multi-monitor feature of a single operating system.

DETAILED DESCRIPTION

Figure 1:
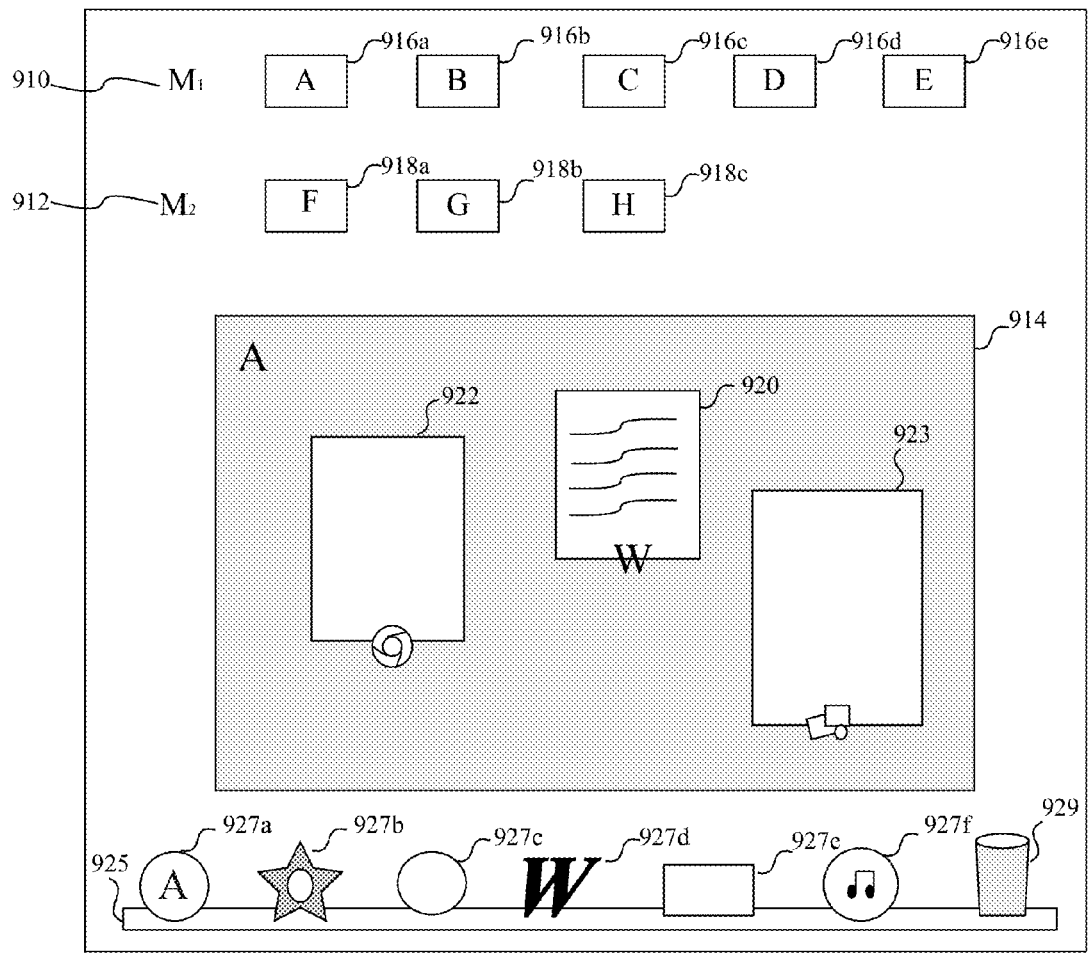
FIG. 1 illustrates a graphical user interface of an operating system in a control mode that allows a user to switch the order in which the desktop switches in response to a gesture.

I. Screen Switching in a Computer Operating System Using Gestures and Desktop Lists Having a Selectable Order One embodiment of the invention relates to a personal computing operating system that provides a plurality of different electronic desktops to be displayed on a monitor and allows a user to switch between the displays using a multi-touch gesture. The operating system provides three or more electronic desktops that can be switched in response to the gesture input (e.g., a finger swipe on a touch pad such as that illustrated in FIG. 8). The operating system uses the same gesture to switch between the three or more electronic desktops and also allows the user to select the order that the screens are switched in response to the gesture. Or in other words, the operating system includes a user selectable "switching order." By way of illustration, in one example, the operating system may provide three electronic desktops A, B, and C, and the operating system can be configured to allow the user to set a first switching order to A←→B←→C or set a second switching order to A←→C←→B. In this example, if the operating system is set to the first switching order and the particular electronic desktops displayed is "A," inputting the gesture may cause the electronic desktops to switch to "B." Alternatively, if the operating system is set to the second switching order and "A" is displayed, the gesture may cause switching to "C."

In one embodiment, the switching order is determined by forming a list of available electronic desktops where the items in the list represent the available electronic desktops. The operating system can display the list of available desktops to the user (i.e., display the items representing the available electronic desktops) and allow the user to assign an order to the items in the list. The order can be assigned by giving each item a numerical value or the items in the list can be arranged into a particular order where the order in the list determines the order in which the switching occurs. For example, the items can be graphical icons displayed on a screen horizontally. The graphical icons can be selectively moved by the user to create a different order. For example, in one embodiment, a cursor can be placed over the icon and selected and then dragged to a new location (so called "drag and drop") to create the desired switching order. The icon can be selected by holding down a finger on a touch pad device for a certain period of time. Alternatively the user may click and drag or right click on the icon and select to move the item from a list of available options. Other mechanisms for creating a switching order can also be used. An example of an alternative embodiment includes presenting a text box to a user that allows the user to select to move the icon to the left or to the right in a horizontal list (or up or down in a vertical list). In a preferred embodiment, the icon is moved using a gesture on a touch pad. This mechanism is particular advantageous because it can use the same input device as the gesture for doing the switching.

The items in the list can be an icon, text, or a smaller version of the electronic desktops. The item in the list can display a background image of the particular electronic desktops and/or display a small version of all or a portion of the applications open on a particular electronic desktops.

The list of available electronic desktops can also be displayed simultaneously with a medium sized graphical version of the currently active electronic desktops. The currently active electronic desktops may be shrunken ask compared to full screen size, from its full screen size to allow for the list of available desktops to be displayed on the same screen. However the active screen may be larger than the individual representations of the available desktops that are not active. The active electronic desktops can include the open applications on that desktop and the open application can be moved from the active electronic desktops to another available desktop in the list.

In one embodiment, the operating system can allow the user to select to display the list of available desktops. Displaying the list can be activated using a gesture on a touch pad. In one embodiment, the gesture for switching between available desktops is a multi-finger swipe. In one embodiment, the switching can include at least two gestures. The two gestures can be used to move in opposite directions within the list. For example, left and right three-finger swipes can be used to move forward and backward, respectively in the list of available screens.

In one embodiment, the present invention also includes a full screen mode in which applications displayed on the active desktop can be selected for full-screen mode. In full screen mode, the selected application can be expanded to fill essentially the entire screen. The applications in full screen mode can also form a new electronic desktops and be added to the list of available desktops. The user can switch between the full-screen application and other available desktops using the gesture. The full-screen applications can also be assigned a desired order in the list of available electronic desktops in the manner described above with regard to other electronic desktops such as those that allow multiple applications to be open and displayed on the electronic desktops.

In one embodiment, the desktop operating system can have provide switching for monitors. In this embodiment, the operating system can allow independent selectable switching orders for both monitors. Each monitor can have its own list of electronic desktops and the electronic desktops can be selectively changed between the two lists and/or within each list to provide independent switching orders for the two separate monitors. In one embodiment the switching order for the two separate monitors can use two distinct gestures so that the switching can be accomplished from a single trackpad. For example one monitor can switch using a three finger swipe and the second monitor can switch using a four finger swipe. The three finger or finger swiping can also be bi-direction in the list. For example, swiping left or right (either three finger or four finger) can move left or right in the list.

Other gestures that can be used on a trackpad to perform desktop switching include holding a finger stationary and moving 1, 2, 3, or four fingers relative to the stationary finger (e.g., a thumb). The track pad sensor detects one finger that is not moving and the additional fingers that are moving relative to the non-moving finger. In addition, the trackpad can detect that the motion is rotational relative to the stationary finger. This rotation is indicative of the stationary finger being on the same hand as the moving fingers because holding one finger stationary (e.g., the thumb) and moving other fingers on the same hand naturally causes a rotation motion of the moving fingers. For detecting switching the movement left and right or rotation motion clockwise and counterclockwise can be correlated to moving left or right or alternatively up and down in a switchable list of electronic desktops. The foregoing gestures can be used alone with other OS functions or in combination with desktop switching and other OS functions.

In another embodiment, where a computer is connected to two monitors, the operating system can be configured to switch from one monitor to the other monitor when opening up a new desktop in full screen. Or in other words, the default for all or a portion of the applications going to full screen mode can be automatically selected to open in full screen on the monitor that is not the monitor displaying the application on a desktop with the application not in full screen. Opening the full screen application on a different monitor allows the user to keep the same desktop active without having to switch back to the desktop. This configuration can be convenient because the desktop used to launch an application into full screen mode is often the same desktop where the next desktop action will be taken (e.g., opening up a second full screen application). Alternatively, the operating system can prompt the user to input which monitor (i.e., which desktop list) the user would like the full screen application to expand to. For example, the operating system can have two different selectable links for expanding to full screen mode (e.g. opposing arrows on a first icon for monitor one and expanding arrows on a second icon for monitor 2).

In an alternative embodiment, the desktop switching can be performed using a keyboard and two different keystrokes. In this embodiment, the switching between desktops (e.g., a desktop displaying the background of a electronic desktops or an application in full screen mode) can scroll both forward and backward in a list of electronic desktops using the two different keystrokes. For example, pressing control right arrow at the same time would scroll to the right in the list and pressing control left arrow would scroll to the left in the list. Other key combination such as control up arrow/down arrow or any other key combinations suitable for scrolling a list can be used.

An important aspect of scrolling a list of electronic desktops is to allow moving in both directions in the list of electronic desktops. This is important because the user may not know or remember how many electronic desktops are available at a given time. In most circumstances the user will want to scroll one desktop over to look at something and scroll back to the desktop that they were previously working in. By allowing the user to go both directions, the user can move back and forth without looking at the list. Thus, in one embodiment, the operating system includes at least one configuration in which switching using keystrokes or gestures occurs without displaying the list and in another configuration the list is displayed in order to allow the user to select the order of switching and/or to move open applications between desktops.

FIG. 1 shows an example screen shot 900 of an operating system user interface that allows a selectable changes in the desktop switching order. The user interface is a control mode where multiple desktops can be viewed and rearranged and where running programs can be moved between electronic desktops. FIG. 1 shows a first desktop list 910 and a second desktop list 912 and an expanded application display 914 showing the applications currently running on Desktop A (916*a*). Application display 914 shows a first running application 920, a second running application 922, and a third running application 923. An application dock 925 includes a plurality of different icons 927*a*-927*f,* which can be selected to run (i.e., launch) a particular application. Dock 925 also includes a trash can 929 where items can be dragged and dropped for deletion.

Figure 2:
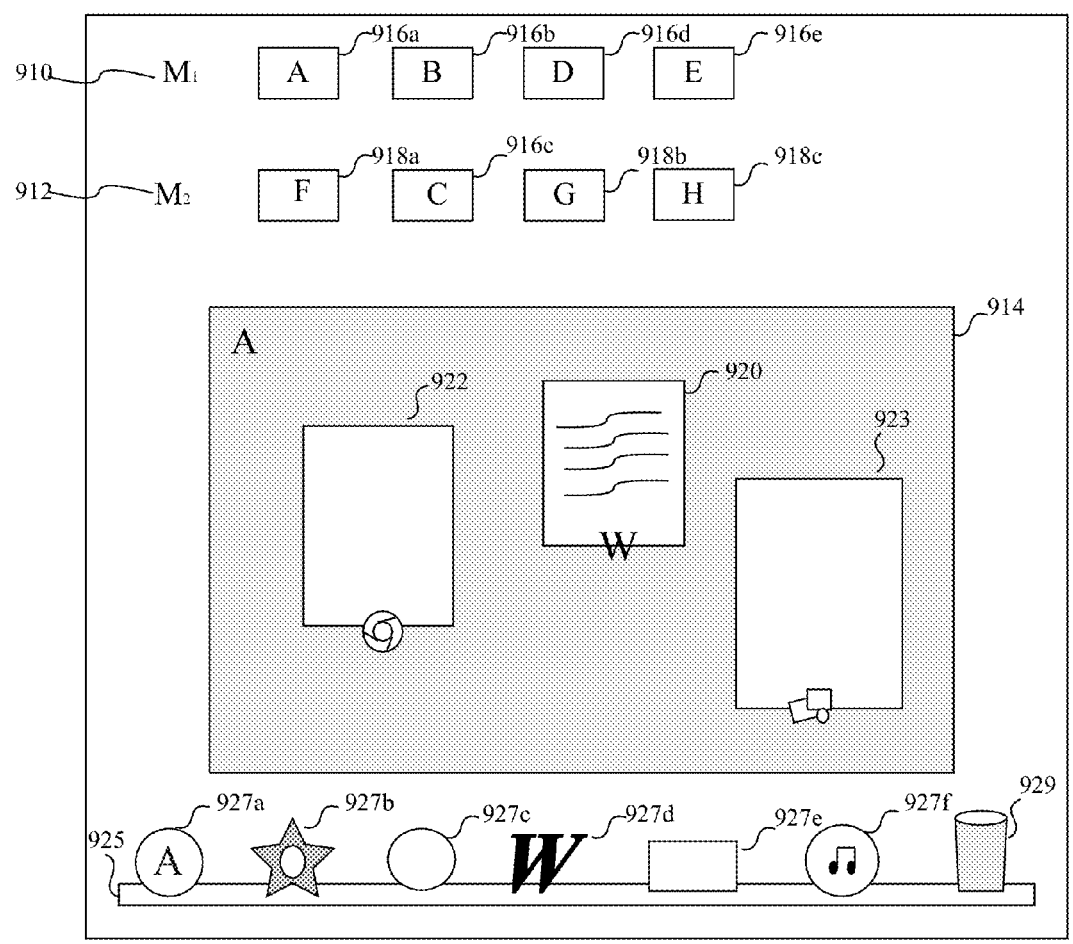
FIG. 2 illustrates the graphical user interface of FIG. 1 with electronic desktop "C" switched from a first monitor to a second monitor.

The desktops in lists 910 and 912 (including applications running in full screen mode that do not overlay an electronic desktop) can be independently moved left to right or right to left within a single list and/or can be moved between list 910 and 912 to create a desired switching order for the first and second monitors. FIG. 2 shows Desktop C dragged and dropped from list 910 and placed between Desktops F and G in list 912. Thus, Desktop C in FIG. 2 will be switched amongst Desktops F, G, and H instead of A, B, D, E as in FIG. 1.

Figure 3:
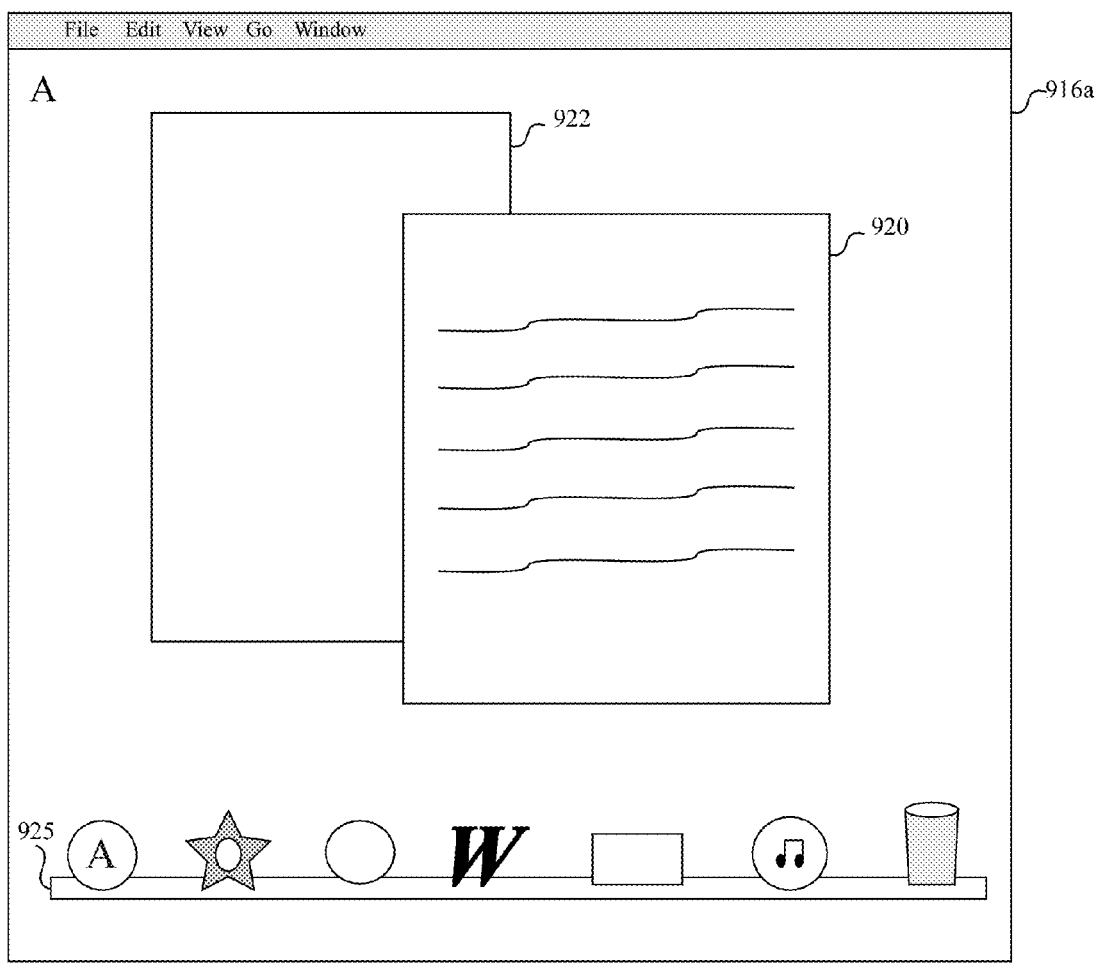
FIG. 3 illustrates a first electronic desktop in a use mode.
Figure 4:
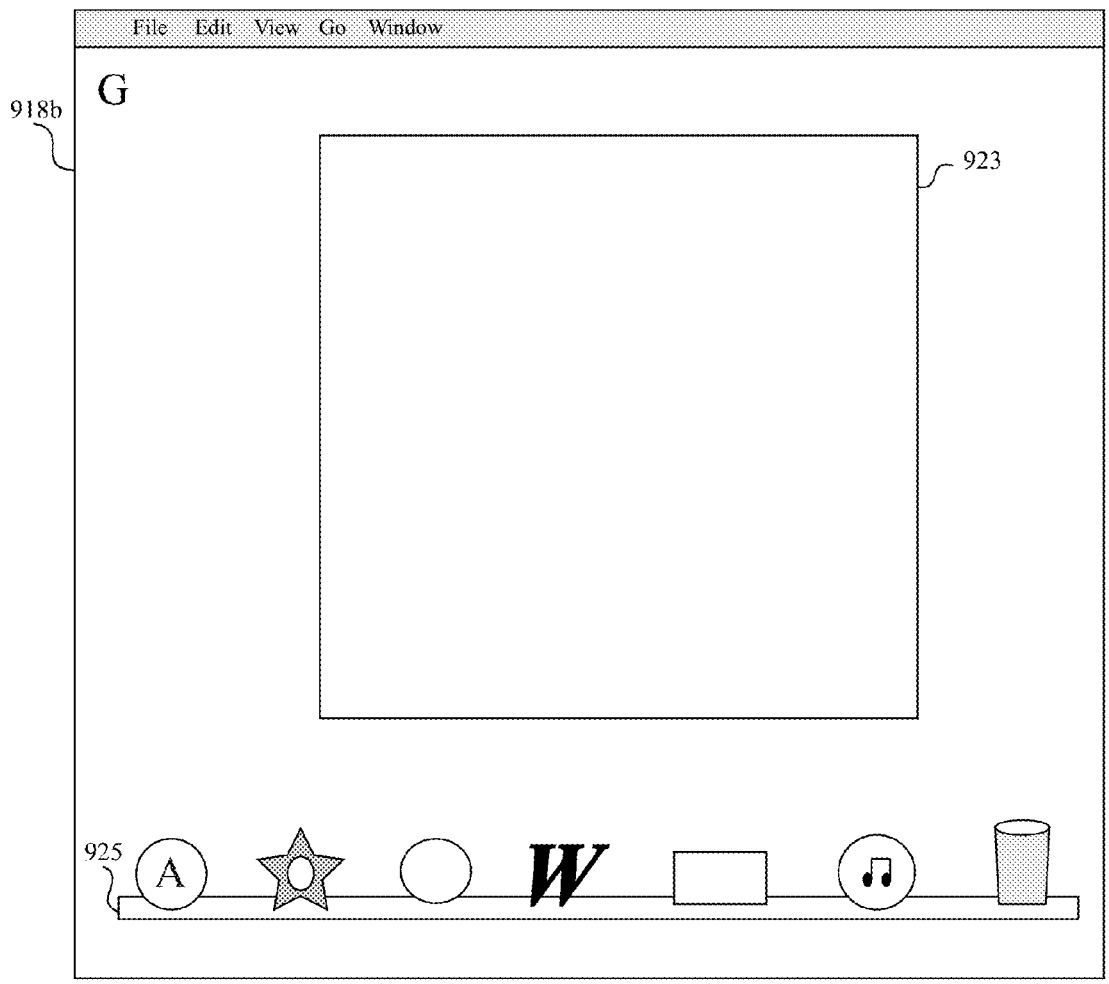
FIG. 4 illustrates a second electronic desktop in a use mode.

The running applications 920, 922, and 923 can be independently positioned on any of desktops 916b-916e or 918a-918c by dragging and dropping the running application displayed in the GUI onto the desired desktop. FIGS. 3-4 illustrate use modes where the user uses running applications. However, FIGS. 3-4 illustrate Desktop A and Desktop G respectively where running application 923 from FIG. 1 has been moved (e.g., by dragging and dropping) to Desktop G. FIG. 3 shows Desktop A with running programs 920 and 923. Desktop 4 shows Desktop G with running program 923.

In an alternative embodiment a single monitor may be divided into multiple displays on a single screen. The first and second displays on the single monitor may each be associated with a plurality of electronic desktops and each electronic desktop may be independently switched between the respective electronic desktops associated with the particular display. The switching may be carried out in any manner described herein including multi-touch gestures on a touch surface.

In one embodiment of the invention a personal computing operating system has computer executable instruction for executing a method that includes all or a portion of the following steps: (i) providing an operating system that displays a plurality of different electronic desktops on an electronic display and allows a user to switch displaying of different desktops using a multi-touch gesture; (ii) displaying a list of available desktops and allowing the user to move individual electronic desktops to form a selected order of electronic desktops; and (iii) in response to the gesture switching between electronic desktops according to the selected order.

II. Computer Program Products

Disclosure within the scope of embodiments illustrated herein can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, several embodiments will be described in the general context of instructions, such as program modules, being executed by computer consoles, computers in network environments. Generally, program modules include routines, programs, objects, components, data structures, etc. that perform particular tasks or implement particular abstract data types. Instructions, associated data structures, and program modules represent examples of the program code means for executing steps of the methods disclosed herein. The particular sequence of such executable instructions or associated data structures represents examples of corresponding acts for implementing the functions described in such steps.

The embodiments illustrated herein may be practiced in network gaming and computing environments with many types of system configurations, including various electronic machines, such as consoles, personal computers, hand-held devices, multi-processor systems, microprocessor-based or programmable consumer electronics, network PCs, minicomputers, mainframe computers, and the like. Several embodiments may also be practiced in distributed gaming and computing environments where tasks are performed by local and remote processing devices that are linked (either by hardwired links, wireless links, or by a combination of hardwired or wireless links) through a communications network. In a distributed computing environment, program modules may be located in both local and remote memory storage devices, for example in reference to a video game machine.

Any of the foregoing embodiments described above may be used alone or in combination with one another and/or the embodiments disclosed in the references incorporated herein by reference.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A computer implemented method for displaying a plurality of electronic desktops on a plurality of monitors, the method comprising:
   providing a personal computing operating system that displays electronic desktops on at least a first monitor and a second monitor of a personal computer and receives gestures as input from a user on a touch sensitive input device;
   providing a first plurality of electronic desktops that are selectably displayed on the first monitor, wherein in response to a first gesture input, the operating system switches the particular desktop being displayed on the first monitor, the switch occurring between electronic desktops of the first plurality of electronic desktops;
   providing a second plurality of electronic desktops separate from the first plurality of desktops, the second plurality of electronic desktops selectably displayed on a second monitor, wherein in response to a second gesture input, the operating system switches the particular desktop being displayed on the second monitor, the switch occurring between electronic desktops of the second plurality of electronic desktops; and
   wherein the first gesture input and/or the second gesture input is a swipe gesture received on the touch sensitive device.

2. The method of claim 1, wherein the input device is a touch sensitive trackpad.

3. The method of claim 1, wherein the first and/or second gesture input includes a multi-touch gesture.

4. The method of claim 1, wherein the first gesture input is a different gesture than the gesture received for the second gesture input.

5. The method of claim 4, wherein the different gesture differs by a number of fingers used to make a swipe on a trackpad.

6. The method of claim 1, wherein the first and second plurality of electronic desktops each includes at least three electronic desktops in a particular order.

7. The method of claim 6, wherein the switching for the first and second monitors is each separately caused by a left or right swipe gesture that causes a switch to an electronic desktop towards the corresponding left or right in the order of the electronic desktops.

8. The method of claim 1, wherein the operating system is configured to display the first plurality of electronic desktops in a first list of electronic desktops and display the second plurality of electronic desktops in a second list of electronic desktops.

9. A personal computer comprising a CPU, RAM, a first monitor, a second monitor, and an operating system configured to display two different electronic desktops on the first and second monitors, respectively, the personal computer including computer executable instructions configured to perform the method of claim 1.

10. A computing system for displaying a plurality of electronic desktops of a computer operating system on a plurality of monitors, comprising:
   a plurality of monitors;
   one or more processors; and
   one or more non-transitory storage devices having stored thereon computer-executable instructions which, when executed by the one or more computer processors implement a method comprising:
      providing a personal computing operating system that displays electronic desktops on at least a first monitor and a second monitor of a personal computer and receives gestures as input from a user on a touch sensitive input device;
      providing a first plurality of electronic desktops that are selectably displayed on the first monitor, wherein in response to a first gesture input, the operating system switches the particular desktop being displayed on the first monitor, the switch occurring between electronic desktops of the first plurality of electronic desktops;

providing a second plurality of electronic desktops separate from the first plurality of desktops, the second plurality of electronic desktops selectably displayed on a second monitor, wherein in response to a second gesture input, the operating system switches the particular desktop being displayed on the second monitor, the switch occurring between electronic desktops of the second plurality of electronic desktops; and wherein the first gesture input and/or the second gesture input is a swipe gesture received on the touch sensitive device.

11. The computing system of claim 10, wherein the first gesture and the second gesture input receives are a same type of gesture.

12. The computing system of claim 10, wherein the first and/or second gesture input includes a multi-touch gesture.

13. The computing system of claim 10, wherein the first and second plurality of electronic desktops each includes at least three electronic desktops in a particular order and wherein the switching for the first and second monitors is each separately caused by a left or right swipe gesture that causes a switch to an electronic desktop towards the corresponding left or right in the order of the electronic desktops.

14. A computing system for displaying a plurality of electronic desktops of a computer operating system on a plurality of monitors, comprising:

a plurality of monitors including at least a first monitor and a second monitor;

one or more processors; and one or more non-transitory storage devices having stored thereon computer-executable instructions which, when executed by the one or more computer processors implement a method comprising:

providing a personal computing operating system that displays a plurality of electronic desktops on the plurality of monitors and receives gestures as input from a user on a touch sensitive input device;

displaying on the plurality of monitors a first list of electronic desktops that are selectable through a first gesture input by the user, wherein upon selection, by the user, of a first particular electronic desktop from the first list, the operating system causes display of the first particular electronic desktop on the first monitor, thereby providing switching of electronic desktops among the electronic desktops of the first list;

displaying on the plurality of monitors a second list of electronic desktops that are selectable through a second gesture input by the user, wherein upon selection, by the user, of a second particular electronic desktop from the second list, the operating system causes display of the second particular electronic desktop on the second monitor, thereby providing switching of electronic desktops among the electronic desktops of the second list; and wherein the first gesture input and/or the second gesture input is a swipe gesture received on the touch sensitive device.

15. The computing system of claim 14, wherein the first gesture and the second gesture are a same type of gesture.

16. The computing system of claim 14, wherein the first and/or second gesture input includes a multi-touch gesture.

17. The computing system of claim 14, wherein the first gesture input is a different gesture than the gesture received for the second gesture input.

18. The computing system of claim 14, wherein the first and second plurality of electronic desktops each includes at least three electronic desktops in a particular order.

19. The computing system of claim 18, wherein the switching for the first and second monitors is each separately caused by a left or right swipe gesture that causes a switch to an electronic desktop towards the corresponding left or right in the order of the electronic desktops.

\* \* \* \* \*